United States Patent
Yang et al.

(10) Patent No.: US 11,671,207 B2
(45) Date of Patent: Jun. 6, 2023

(54) METHOD FOR IMPLEMENTING AUTOMATIC RETRANSMISSION FUNCTION AND RELATED STATION

(71) Applicant: ZTE Corporation, Guangdong (CN)

(72) Inventors: Dan Yang, Guangdong (CN); Ning Wei, Guangdong (CN); Nan Li, Guangdong (CN); Zhiqiang Han, Guangdong (CN); Bo Sun, Guangdong (CN)

(73) Assignee: ZTE Corporation, Shenzhen (CN)

( * ) Notice: Subject to any disclaimer, the term of this patent is extended or adjusted under 35 U.S.C. 154(b) by 97 days.

(21) Appl. No.: 17/275,154

(22) PCT Filed: Sep. 9, 2019

(86) PCT No.: PCT/CN2019/104948
§ 371 (c)(1),
(2) Date: Mar. 10, 2021

(87) PCT Pub. No.: WO2020/052521
PCT Pub. Date: Mar. 19, 2020

(65) Prior Publication Data
US 2022/0060287 A1    Feb. 24, 2022

(30) Foreign Application Priority Data
Sep. 11, 2018  (CN) .......................... 201811057192.4

(51) Int. Cl.
*H04L 1/18*     (2023.01)
*H04L 1/1812*   (2023.01)

(52) U.S. Cl.
CPC .................................. *H04L 1/1819* (2013.01)

(58) Field of Classification Search
CPC .... H04L 1/1812; H04L 1/1816; H04L 1/1819
See application file for complete search history.

(56) References Cited

U.S. PATENT DOCUMENTS

| | | | |
|---|---|---|---|
| 2008/0209297 A1* | 8/2008 | Chandra | H04L 1/188 370/310 |
| 2012/0213170 A1 | 8/2012 | Choi et al. | |
| 2012/0270557 A1 | 10/2012 | Ahluwalia | |

(Continued)

FOREIGN PATENT DOCUMENTS

| CN | 101529781 A | 9/2009 |
|---|---|---|
| CN | 101674650 A | 3/2010 |

(Continued)

OTHER PUBLICATIONS

CN 201811057192.4, Dec. 3, 2021, Chinese Office Action.
International Search Report dated Nov. 28, 2019 in connection with International Application No. PCT/CN2019/104948.

(Continued)

*Primary Examiner* — Shukri Taha
(74) *Attorney, Agent, or Firm* — Wolf, Greenfield & Sacks, P.C.

(57) ABSTRACT

Provided are a method for implementing an automatic retransmission function and a related station. The method includes that a first station sends a first message. The first message carries automatic retransmission enable information. The automatic retransmission enable information is used for instructing that the automatic retransmission function be enabled or disabled.

16 Claims, 6 Drawing Sheets

(56) References Cited

U.S. PATENT DOCUMENTS

| | | | | |
|---|---|---|---|---|
| 2015/0092645 A1* | 4/2015 | Tabet | .................... | H04L 1/1812 370/311 |
| 2016/0191212 A1* | 6/2016 | Park | .................... | H04L 1/1877 370/252 |
| 2016/0261391 A1* | 9/2016 | Chen | .................... | H04L 1/1861 |
| 2019/0150180 A1* | 5/2019 | Zou | .................... | H04L 1/1812 370/329 |
| 2019/0379490 A1* | 12/2019 | Liu | .................... | H04W 76/11 |
| 2022/0060287 A1* | 2/2022 | Yang | .................... | H04L 1/1887 |

FOREIGN PATENT DOCUMENTS

| | | | |
|---|---|---|---|
| CN | 101796761 A | | 8/2010 |
| CN | 101807984 A | | 8/2010 |
| CN | 107431581 A | | 12/2017 |
| CN | 108112041 A | | 6/2018 |
| EP | 1852994 A1 | | 11/2007 |
| WO | WO 2013/062384 A1 | | 5/2013 |

OTHER PUBLICATIONS

Extended European Search Report dated May 4, 2022, in connection with European Application No. EP 19859358.4.
Chinese Office Action dated May 17, 2022, in connection with Chinese Application No. 201811057192.4.
Chinese Office Action dated Dec. 3, 2021 in connection with Chinese Application No. 201811057192.4.
[No Author Listed], Discussion on HARQ timing and process for NR. R1-1704919. 3GPP TSG RAN WG1 Meeting #88bis. LG Electronics. Apr. 3-7, 2017. 5 pages.
[No Author Listed], PUCCH resource allocation for HARQ-ACK feedback to Msg4. R1-1711283. 3GPP TSG RAN WG1 NR Ad-Hoc#2. Motorola Mobility, Lenovo. Jun. 27-30, 2017. 4 pages.
[No Author Listed], The Research of Hybrid ARG Protocol in the Fourth Generation Mobilt Communications Systems. Mar. 2008. 86 pages.
EP 1959358.4, May 4, 2022, Extended European Search Report.
CN 201811057192.4, May 17, 2022, Chinese Office Action.

* cited by examiner

METHOD FOR IMPLEMENTING AUTOMATIC RETRANSMISSION FUNCTION AND RELATED STATION

CROSS REFERENCES TO RELATED APPLICATIONS

This Application is a national stage filing under 35 U.S.C. § 371 of International Patent Application Serial No. PCT/CN2019/104948, filed Sep. 9, 2019, entitled METHOD FOR IMPLEMENTING AUTOMATIC RETRANSMISSION FUNCTION AND RELATED STATION. Foreign priority benefits are claimed under 35 U.S.C. § 119(a)-(d) or 35 U.S.C. § 365(b) of Chinese application number 201811057192.4, filed Sep. 11, 2018. The entire contents of these applications are incorporated herein by reference in their entirety.

TECHNICAL FIELD

Embodiments of the present disclosure relate to, but are not limited to, a wireless local area network.

BACKGROUND

With the development of the wireless local area network technology, the performance of Wi-Fi is constantly improved, the requirements for the reliability of transmission are also constantly improved, and edge users are supported.

In a wireless local area network, common devices are stations (STAs), including access points (APs) and non-access points (non-APs). Multiple stations form one basic service set (BSS). An STA associates with an AP through a scanning, authentication and association process. The STA communicates with the AP or communicates with other STAs through the AP. In another type of wireless local area network, for example, an independent BSS (IBSS), there is no AP-like access point, and all stations can communicate with each other directly.

The packet acknowledgment mechanism currently used in a wireless local area network is as follows: A sender station sends a data packet. The data frame carries a response policy. The response policy is used for indicating whether a receiver needs to reply with a correctness acknowledgment frame. After receiving the data packet, the receiver station determines whether the receiving is correct. When the receiving is determined to be correct, the receiver station replies with a correctness acknowledgement frame; otherwise, the receiver station does not reply with any response. When the receiving is incorrect, the station discards the packet.

Although the discarded packet cannot be decoded correctly, the packet still contains useful information. If the packet is discarded, the useful information is lost. In order for the useful information to be further utilized in the wireless local area network, an automatic retransmission mechanism needs to be introduced. In the wireless local area network, stations are different in capability, that is, not all stations support the automatic retransmission mechanism, and links are different in communication quality and thus are different in whether to enable the automatic retransmission mechanism.

Therefore, no solution for implementing an automatic retransmission function has been provided in the existing art to satisfy different automatic retransmission mechanism requirements of different stations.

SUMMARY

In one aspect, embodiments of the present disclosure provide a method for implementing an automatic retransmission function. The method includes that a first station sends a first message. The first message carries automatic retransmission enable information. The automatic retransmission enable information is used for instructing that the automatic retransmission function be enabled or disabled.

In another aspect, embodiments of the present disclosure provide a method for implementing an automatic retransmission function. The method includes that a second station receives a first message sent by a first station; and the second station enables or disables the automatic retransmission function according to automatic retransmission enable information carried in the first message.

In another aspect, embodiments of the present disclosure provide a first station. The first station includes a sending unit. The sending unit is configured to send a first message. The first message carries automatic retransmission enable information. The automatic retransmission enable information is used for instructing that the automatic retransmission function be enabled or disabled.

In another aspect, embodiments of the present disclosure provide a second station. The second station includes a receiving unit and a control unit. The receiving unit is configured to receive a first message sent by a first station. The first message carries automatic retransmission enable information. The automatic retransmission enable information is used for instructing that the automatic retransmission function be enabled or disabled. The control unit is configured to enable or disable the automatic retransmission function according to the automatic retransmission enable information.

In another aspect, embodiments of the present disclosure provide a first station. The first station includes a memory, a processor, and a computer program stored in the memory and executable on the processor. When the computer program is executed by the processor, the method for implementing an automatic retransmission function as described herein is performed.

In another aspect, embodiments of the present disclosure provide a second station. The second station includes a memory, a processor, and a computer program stored in the memory and executable on the processor. When the computer program is executed by the processor, the method for implementing an automatic retransmission function as described herein is performed.

In another aspect, embodiments of the present disclosure provide a computer-readable storage medium. An information processing program is stored in the computer-readable storage medium. When the information processing program is executed by the processor, steps of the method for implementing an automatic retransmission function as described herein are performed.

Other features and advantages of the present disclosure are elaborated later in the description and partially become apparent from the description or are understood through implementation of the present disclosure. The objects and other advantages of the present disclosure can be implemented and obtained through structures particularly set forth in the description, claims and drawings.

BRIEF DESCRIPTION OF DRAWINGS

The drawings are used for providing a further understanding of the solution of the present disclosure, constitute a part of the description, illustrate the solution of the present disclosure in conjunction with embodiments of the present application, and do not limit the solution of the present disclosure.

DETAILED DESCRIPTION

Objects, solutions and advantages of the present disclosure will be more apparent from a detailed description of embodiments of the present disclosure in conjunction with the drawings. It is to be noted that if not in collision, the embodiments described herein and the features thereof may be combined with each other.

The steps illustrated in the flowcharts among the drawings may be performed in, for example, a computer system capable of executing a set of computer-executable instructions. Moreover, although logical sequences are illustrated in the flowcharts, the illustrated or described steps may be performed in sequences different from those described herein in some cases.

Currently, in a wireless local area network, stations are different in capability, that is, not all stations support an automatic retransmission mechanism, and links are different in communication quality and thus are different in whether to enable the automatic retransmission mechanism. Moreover, the processing method used when an incorrect data packet is received in the case where the automatic retransmission mechanism is used is different from the processing method used when an incorrect data packet is received in the case where the automatic retransmission mechanism is not used. Therefore, a notification mechanism is required to enable a station to know which operation should be performed.

For this reason, the present disclosure provides a new solution for implementing an automatic retransmission mechanism. In this solution, through an automatic retransmission enable instruction, a station is notified whether to enable the automatic retransmission mechanism. In this manner, different automatic retransmission mechanism requirements of different stations can be satisfied.

The following describes in detail, through some embodiments, the solution for implementing an automatic retransmission mechanism according to the present disclosure.

Figure 1:
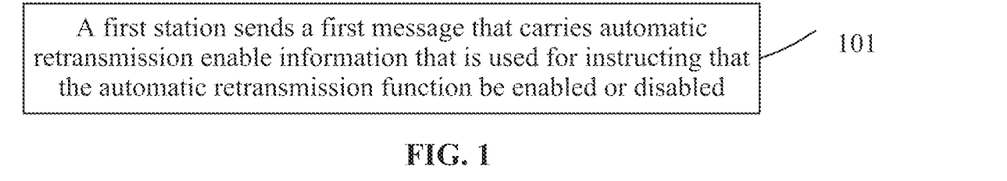
FIG. 1 is a flowchart of a method for implementing an automatic retransmission function according to some embodiments of the present disclosure.

FIG. 1 is a flowchart of a method for implementing an automatic retransmission function according to some embodiments of the present disclosure. As shown in FIG. 1, in some embodiments, the method may include step 101.

In step 101, a first station sends a first message. The first message carries automatic retransmission enable information. The automatic retransmission enable information is used for instructing that the automatic retransmission function be enabled or disabled.

In one embodiment, when the automatic retransmission enable information is used for instructing that the automatic retransmission function be enabled, the automatic retransmission enable information is further used for instructing that an automatic retransmission buffer be configured for the current transmission.

In one embodiment, when the automatic retransmission enable information instructs that the automatic retransmission function be enabled, the instruction includes enabling the automatic retransmission function immediately or delaying enabling the automatic retransmission function; and when the instruction is delaying enabling the automatic retransmission function, the first message further includes information about start time at which the automatic retransmission function is enabled.

In one embodiment, when the automatic retransmission enable information instructs that the automatic retransmission function be enabled, the first station further sends at least one of the following time information: duration in which the automatic retransmission function is enabled or information about calculation of the duration, or time at which the automatic retransmission function is disabled. The duration in which the automatic retransmission function is enabled or the information about the calculation of the duration is used for instructing that timekeeping start from start time at which the automatic retransmission function is enabled and the automatic retransmission function be disabled when the duration ends. The time information is contained in the first message or in a second message sent by the first station.

In one embodiment, the first station further sends information about automatic retransmission. The information about the automatic retransmission includes at least one of redundancy version information of a data frame or a retransmission frame of the data frame or indication information of new transmission or retransmission.

Figure 2:
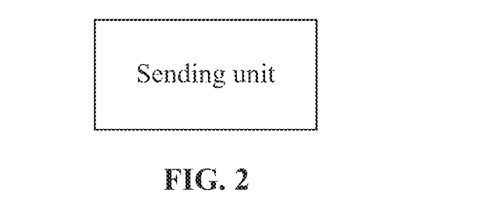
FIG. 2 is a structural diagram of a first station according to some embodiments of the present disclosure.

FIG. 2 is a structural diagram of a first station according to some embodiments of the present disclosure. As shown in FIG. 2, in some embodiments, the first station may include a sending unit. The sending unit is configured to send a first message. The first message carries automatic retransmission enable information. The automatic retransmission enable information is used for instructing that the automatic retransmission function be enabled or disabled.

In one embodiment, when the automatic retransmission enable information is used for instructing that the automatic retransmission function be enabled, the automatic retransmission enable information is further used for instructing that an automatic retransmission buffer be configured for the current transmission.

In one embodiment, when the automatic retransmission enable information instructs that the automatic retransmission function be enabled, the instruction includes enabling the automatic retransmission function immediately or delaying enabling the automatic retransmission function; and when the instruction is delaying enabling the automatic retransmission function, the first message further includes information about start time at which the automatic retransmission function is enabled.

In one embodiment, when the automatic retransmission enable information instructs that the automatic retransmission function be enabled, the sending unit is further configured to send at least one of the following time information: duration in which the automatic retransmission function is enabled or information about calculation of the duration, or time at which the automatic retransmission function is disabled. The duration in which the automatic retransmission function is enabled or the information about the calculation of the duration is used for instructing that timekeeping start from start time at which the automatic retransmission function is enabled and the automatic retransmission function be disabled when the duration ends. The time information is contained in the first message or in a second message sent by the first station.

In one embodiment, the sending unit is further configured to send information about automatic retransmission. The information about the automatic retransmission includes at least one of redundancy version information of a data frame or a retransmission frame of the data frame or indication information of new transmission or retransmission.

Figure 3:
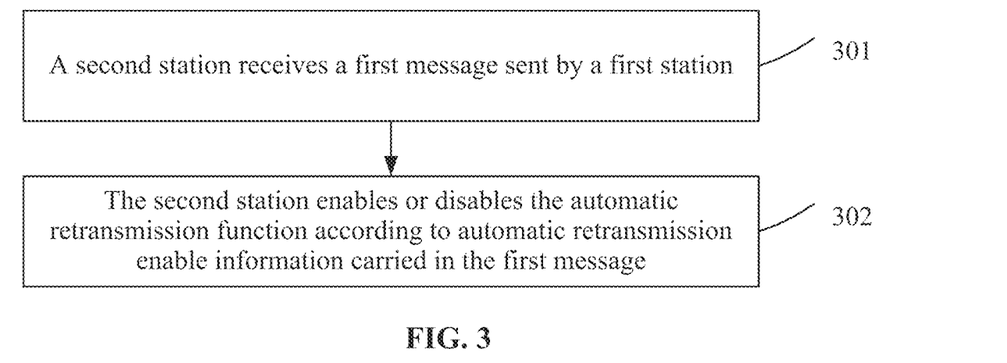
FIG. 3 is a flowchart of a method for implementing an automatic retransmission function according to some embodiments of the present disclosure.

FIG. 3 is a flowchart of a method for implementing an automatic retransmission function according to some embodiments of the present disclosure. As shown in FIG. 3, in some embodiments, the method may include steps 301 and 302.

In step 301, a second station receives a first message sent by a first station.

In step 302, the second station enables or disables the automatic retransmission function according to automatic retransmission enable information carried in the first message.

In one embodiment, the method may further include that the second station configures an automatic retransmission buffer according to the automatic retransmission enable information.

In one embodiment, when the second station enables the automatic retransmission function according to the automatic retransmission enable information, the method may further include that the second station receives a data frame or a retransmission frame of the data frame sent by a third station and determines whether the data frame or the retransmission frame is received correctly; and when the data frame or the retransmission frame is determined to be received incorrectly, the second station buffers the data frame or the retransmission frame into an automatic retransmission buffer or performs combination processing of the retransmission frame of the data frame and the data frame or the retransmission frame of the data frame buffered in the automatic retransmission buffer.

In one embodiment, after the combination processing of the retransmission frame of the data frame and the data frame or the retransmission frame of the data frame buffered in the automatic retransmission buffer is performed when the data frame or the retransmission frame is determined to be received incorrectly, the method may further include that the second station determines whether a combination-processed data frame is received correctly, and when the combination-processed data frame is received incorrectly, the second station buffers the combination-processed data frame into the automatic retransmission buffer; and when the combination-processed data frame is received correctly, the second station decodes the data frame and clears the data frame or the retransmission frame of the data frame and the combination-processed data frame in the automatic retransmission buffer.

In one embodiment, the method may further include that when the combination-processed data frame is determined to be received incorrectly, the second station performs combination processing of the combination-processed data buffered in the automatic retransmission buffer and the data frame or the retransmission frame of the data frame.

In one embodiment, when the combination-processed data frame is determined to be received incorrectly, performing the combination processing of the combination-processed data buffered in the automatic retransmission buffer and the data frame or the retransmission frame of the data frame includes performing the combination processing according to information about automatic retransmission carried in the data frame or the retransmission frame of the data frame. The information about the automatic retransmission includes at least one of redundancy version information of the data frame or the retransmission frame of the data frame or indication information of new transmission or retransmission.

In one embodiment, when the data frame or the retransmission frame is determined to be received incorrectly, the second station returns an incorrect-reception response frame to the third station.

In one embodiment, the second station clears the automatic retransmission buffer when one of the following conditions is satisfied: (1) a data frame or a retransmission frame of the data frame is received correctly; or (2) the total size of a data frame and a retransmission frame of the data frame buffered reaches the size of the automatic retransmission buffer.

In one embodiment, the third station and the first station are the same station or the third station and the first station are different stations.

Figure 4:
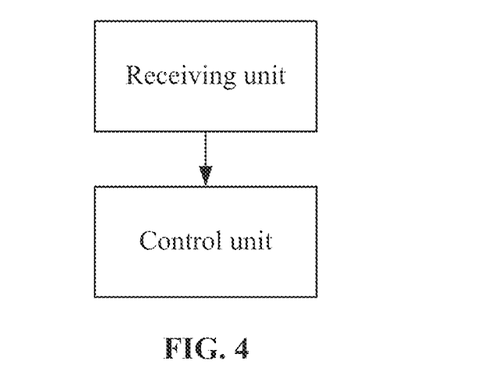
FIG. 4 is a structural diagram of a second station according to some embodiments of the present disclosure.

FIG. 4 is a structural diagram of a second station according to some embodiments of the present disclosure. As shown in FIG. 4, in some embodiments, the second station may include a receiving unit and a control unit. The receiving unit is configured to receive a first message sent by a first station. The control unit is configured to enable or disable the automatic retransmission function according to the automatic retransmission enable information carried in the first message.

In one embodiment, the second station may further include a configuration unit. The configuration unit is configured to configure an automatic retransmission buffer according to the automatic retransmission enable information.

In one embodiment, when the automatic retransmission function is enabled according to the automatic retransmission enable information, the receiving unit is further configured to receive a data frame or a retransmission frame of the data frame sent by a third station, and the second station further includes a determination unit configured to determine whether the data frame or the retransmission frame is received correctly; when the data frame or the retransmission frame is determined to be received incorrectly, the data frame or the retransmission frame is buffered into an automatic retransmission buffer or combination processing of the retransmission frame of the data frame and the data frame or the retransmission frame of the data frame buffered in the automatic retransmission buffer is performed.

In one embodiment, after the combination processing of the retransmission frame of the data frame and the data frame or the retransmission frame of the data frame buffered in the automatic retransmission buffer is performed when the data frame or the retransmission frame is determined to be received incorrectly, the determination unit is further configured to determine whether a combination-processed data frame is received correctly; when the combination-processed data frame is received incorrectly, the combination-processed data frame is buffered into the automatic retransmission buffer; when the combination-processed data frame is received correctly, the data frame is decoded and the data frame or the retransmission frame of the data frame and the combination-processed data frame in the automatic retransmission buffer are cleared.

In one embodiment, the determination unit is further configured such that when the combination-processed data frame is determined to be received incorrectly, the second station performs combination processing of the combination-processed data buffered in the automatic retransmission buffer and the data frame or the retransmission frame of the data frame.

In one embodiment, the determination unit is further configured to perform the combination processing according to information about automatic retransmission carried in the data frame or the retransmission frame of the data frame. The information about the automatic retransmission includes at least one of redundancy version information of the data frame or the retransmission frame of the data frame or indication information of new transmission or retransmission.

In one embodiment, the second station further includes a reply unit. The reply unit is configured to, when the data frame or the retransmission frame is determined to be received incorrectly, return an incorrect-reception response frame to the third station.

In one embodiment, the second station further includes a clearing unit. The clearing unit is configured to clear the automatic retransmission buffer when one of the following conditions is satisfied: (1) a data frame or a retransmission frame of the data frame is received correctly; or (2) the total size of a data frame and a retransmission frame of the data frame buffered reaches the size of the automatic retransmission buffer.

In the solution provided in the preceding embodiments of the present disclosure, through automatic retransmission enable information, a station is notified whether to enable the automatic retransmission mechanism. In this manner, different automatic retransmission mechanism requirements of different stations can be satisfied. Further, a station on which the automatic retransmission mechanism is enabled does not discard an incorrectly received data frame, but performs combination processing of the incorrectly received data frame and a retransmission frame of this data frame. In this manner, useful information of a data packet that cannot be decoded correctly can be reasonably utilized.

The following describes in detail, through some example embodiments, the solution according to the preceding embodiments of the present disclosure.

Figure 5:
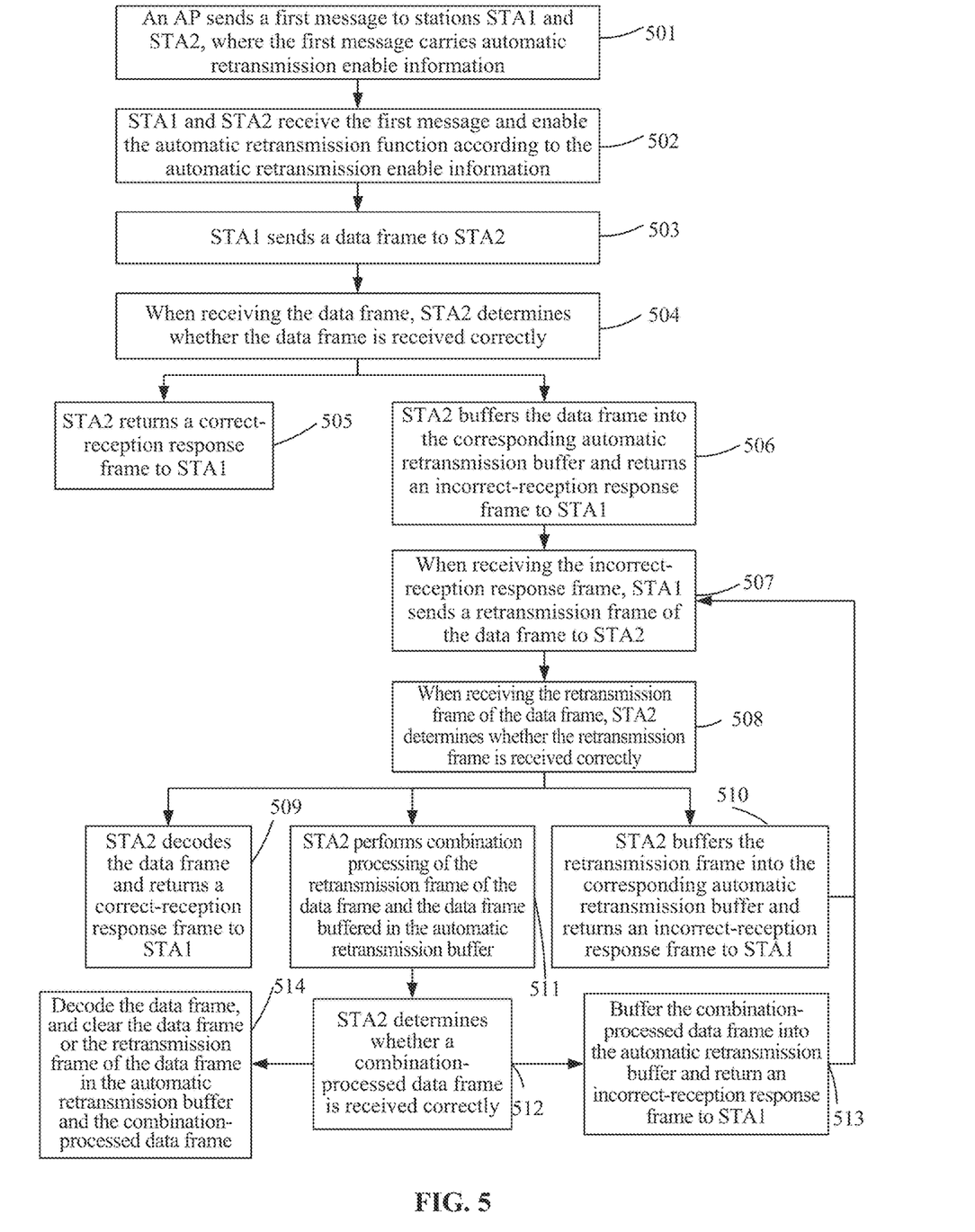
FIG. 5 is a flowchart of a method for implementing an automatic retransmission function according to example embodiments of the present disclosure.
Figure 6:
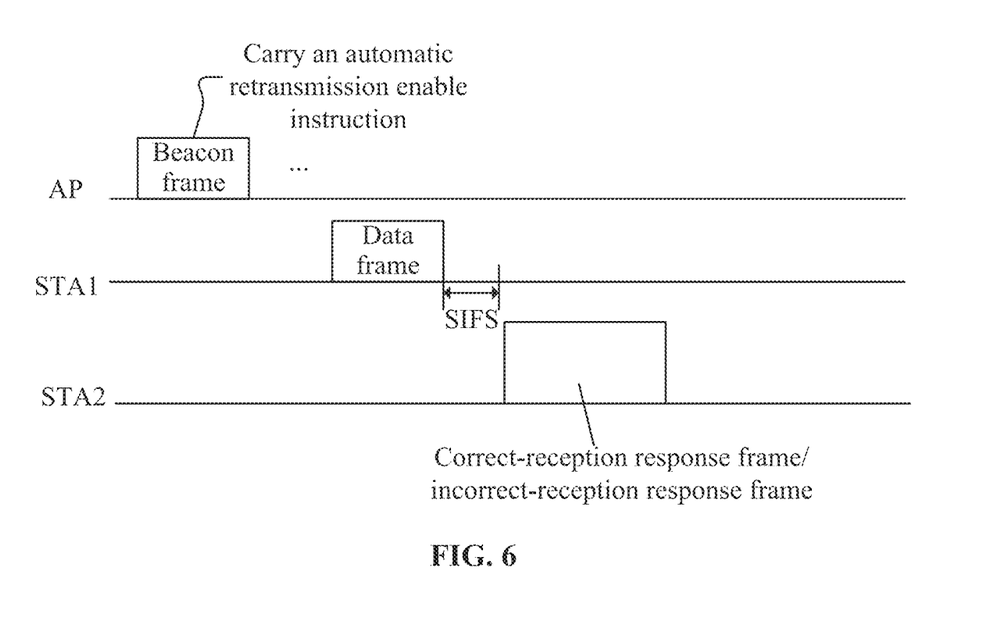
FIG. 6 is a diagram illustrating operations of a method for implementing an automatic retransmission function according to example embodiments of the present disclosure.

FIG. 5 is a flowchart of a method for implementing an automatic retransmission function according to example embodiments of the present disclosure. FIG. 6 is a diagram illustrating operations of a method for implementing an automatic retransmission function according to example embodiments of the present disclosure. As shown in FIG. 5, in one example embodiment, the method may include steps 501 to 513.

In step 501, an access point (AP) sends a first message to stations STA1 and STA2. The first message carries automatic retransmission enable information. The automatic retransmission enable information is used for indicating whether to enable the automatic retransmission function, that is, used for instructing STA1 and STA2 to enable or disable the automatic retransmission function.

When the automatic retransmission enable instruction is used for instructing that the automatic retransmission function be enabled, the automatic retransmission enable instruction is further used for instructing that an automatic retransmission buffer be configured for the current transmission. That is, when the automatic retransmission enable information instructs that the automatic retransmission function be enabled, STA1 and STA2 get ready their respective automatic retransmission buffers.

Additionally, when the automatic retransmission enable instruction is used for instructing that the automatic retransmission function be disabled, the automatic retransmission enable instruction may be further used for instructing that the automatic retransmission buffer be canceled.

For example, there are multiple stations (STAs) in a wireless network, including access points (hereinafter referred to as APs) and non-access points (hereinafter referred to as non-APs). For example, one basic service set (BSS) may be formed by one AP and two stations STA1 and STA2. STA1 may be a non-AP or an AP. STA2 may also be an AP or a non-AP.

For example, the first message may be carried in a beacon frame, probe response frame or (re)association response frame sent from the AP to STA1 and STA2. For example, as shown in FIG. 6, in this example embodiment, the automatic retransmission enable instruction may be carried in a beacon frame sent by the AP.

In step 502, STA1 and STA2 receive the first message and enable the automatic retransmission function according to the automatic retransmission enable information.

When the automatic retransmission enable information is used for instructing that the automatic retransmission function be enabled, STA1 and STA2 enable or do not disable their respective automatic retransmission functions after receiving the automatic retransmission enable information. When the automatic retransmission enable information is used for instructing that the automatic retransmission function be disabled, STA1 and STA2 disable or do not enable their respective automatic retransmission functions after receiving the automatic retransmission enable instruction.

When the automatic retransmission enable information is used for instructing that the automatic retransmission function be enabled, the automatic retransmission enable information is further used for instructing that an automatic retransmission buffer is configured for the current transmission. In this manner, STA1 and STA2 may also configure their respective automatic retransmission buffers according to the automatic retransmission enable information.

In step 503, STA1 sends a data frame to STA2.

In step 504, when receiving the data frame, STA2 determines whether the data frame is received correctly.

The operation of determining whether the data frame is received correctly falls into the existing art and is not described in detail here.

When the data frame is determined to be received correctly, step 505 is performed. When the data frame is determined to be received incorrectly, step 506 is performed.

In step 505, STA2 returns a correct-reception response frame to STA1.

In step 506, STA2 buffers the data frame into the corresponding automatic retransmission buffer and returns an incorrect-reception response frame to STA1.

The interframe space between the response frame and the data frame may be a short interframe space (SIFS) or another interframe space. For example, in this example embodiment, as shown in FIG. 6, the interframe space between the response frame and the data frame is a short interframe space.

When receiving the correct-reception response frame, STA1 transmits the data frame successfully and may continue to transmit the next data frame; otherwise, step 507 is performed.

In step 507, when receiving the incorrect-reception response frame, STA1 sends a retransmission frame of the data frame to STA2.

The retransmission frame of the data frame carries the same valid information as the data frame and carries the same redundant information as the data frame or different redundant information than the data frame. The valid information is information bits to be coded and transmitted. The data frame includes, but is not limited to, a first transmission frame.

In step 508, when receiving the retransmission frame of the data frame, STA2 determines whether the retransmission frame is received correctly.

When the data frame is determined to be received correctly, transmission of the data frame is successful, and step 509 is performed. When the data frame is determined to be received incorrectly, step 510 or 511 is performed.

In step 509, STA2 decodes the data frame and returns a correct-reception response frame to STA1.

In step 510, STA2 buffers the retransmission frame into the corresponding automatic retransmission buffer and returns an incorrect-reception response frame to STA1.

In step 511, STA2 performs combination processing of the retransmission frame of the data frame and the data frame buffered in the automatic retransmission buffer.

After step 511, steps 512 and 513 may also be performed.

In step 512, STA2 determines whether a combination-processed data frame is received correctly. When the combination-processed data frame is received incorrectly, step 513 is performed. When the combination-processed data frame is received correctly, step 514 is performed.

In step 513, the combination-processed data frame is buffered into the automatic retransmission buffer.

Further, step 513 may further include returning an incorrect-reception response frame to STA1.

In step 514, the data frame is decoded, and the data frame or the retransmission frame of the data frame and the combination-processed data frame in the automatic retransmission buffer are cleared.

When receiving the incorrect-reception response frame, STA1 returns to step 507 and sends the retransmission frame of the data frame to STA2 again. Then, again STA2 determines whether the retransmission frame is received correctly. These operations are performed repeatedly until the data frame is transmitted successfully. In the flow of the preceding method, when the reception is determined to be incorrect and combination processing is required, if stored in the automatic retransmission buffer is a combined data frame that has been combination-processed previously, then the current operation is combination processing of the last received frame and the combined frame buffered in the buffer.

Figure 7:
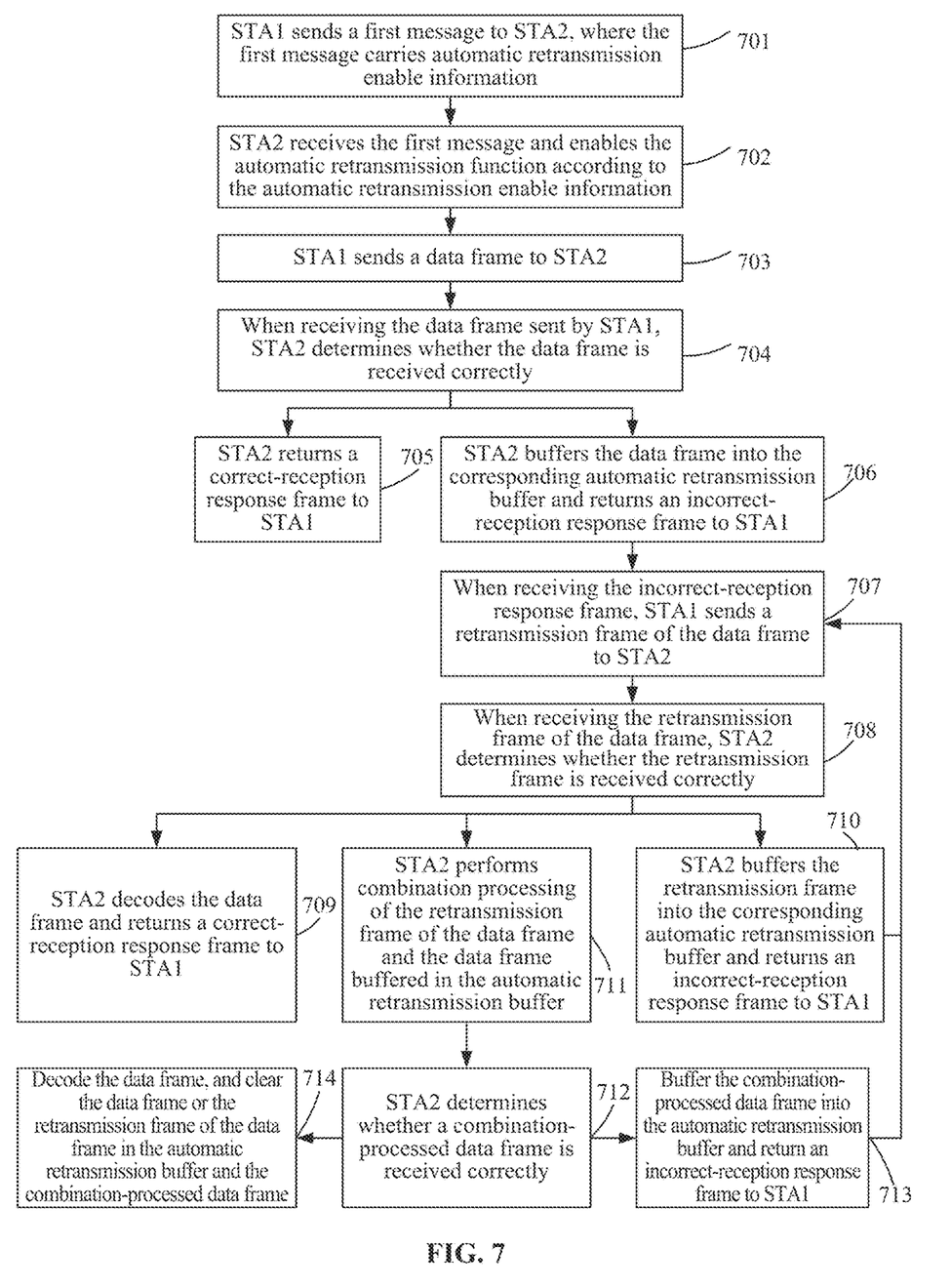
FIG. 7 is a flowchart of a method for implementing an automatic retransmission function according to example embodiments of the present disclosure.
Figure 8:
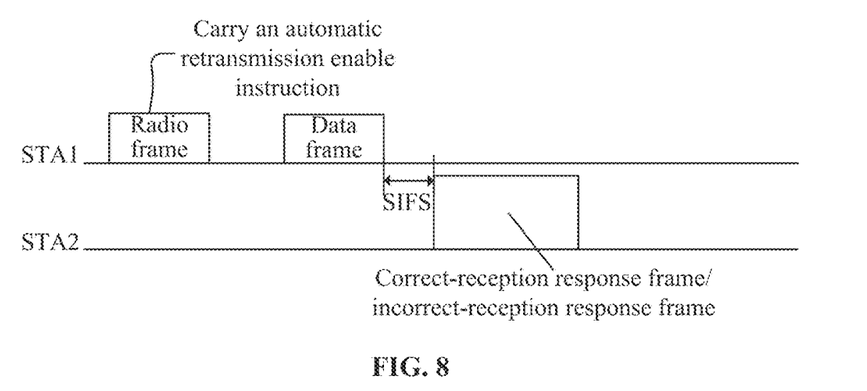
FIG. 8 is a diagram illustrating operations of a method for implementing an automatic retransmission function according to example embodiments of the present disclosure.

FIG. 7 is a flowchart of a method for implementing an automatic retransmission function according to example embodiments of the present disclosure. FIG. 8 is a diagram illustrating operations of a method for implementing an automatic retransmission function according to example embodiments of the present disclosure. As shown in FIG. 7, in one example embodiment, the method may include steps 701 to 713.

In step 701, STA1 sends a first message to STA2. The first message carries automatic retransmission enable information. The automatic retransmission enable information is used for indicating whether to enable the automatic retransmission function, that is, used for instructing STA2 to enable or disable the automatic retransmission function.

For example, there are multiple stations (STAs) in a wireless network, including access points (hereinafter referred to as APs) and non-access points (hereinafter referred to as non-APs). For example, one basic service set (BSS) may be formed by two stations STA1 and STA2. STA1 may be a non-AP or an AP. STA2 may also be an AP or a non-AP.

For example, the first message may be carried in a radio frame sent by STA1 to STA2. See FIG. 8.

In step 702, STA2 receives the first message and enables the automatic retransmission function according to the automatic retransmission enable information.

When the automatic retransmission enable information is used for instructing that the automatic retransmission function be enabled, STA2 enables or does not disable its own automatic retransmission function after receiving the automatic retransmission enable information.

When the automatic retransmission enable information is used for instructing that the automatic retransmission function be disabled, STA2 disables or does not enable its own automatic retransmission function after receiving the automatic retransmission enable information.

When the automatic retransmission enable information is used for instructing that the automatic retransmission function be enabled, the automatic retransmission enable information is further used for instructing that an automatic retransmission buffer be configured for the current transmission. That is, when the automatic retransmission enable information instructs that the automatic retransmission function be enabled, STA2 gets ready its own automatic retransmission buffer.

When the automatic retransmission enable information is used for instructing that the automatic retransmission function be disabled, the automatic retransmission enable information may be further used for instructing that the automatic retransmission buffer be canceled.

In this manner, STA2 may also configure the automatic retransmission buffer for the current transmission according to the received automatic retransmission enable information.

In step 703, STA1 sends a data frame to STA2.

For example, the first message may also be carried in the data frame.

In step 704, when receiving the data frame sent by STA1, STA2 determines whether the data frame is received correctly.

The operation of determining whether the data frame is received correctly falls into the existing art and is not described in detail here.

When the data frame is determined to be received correctly, step 705 is performed. When the data frame is determined to be received incorrectly, step 706 is performed.

In step 705, STA2 returns a correct-reception response frame to STA1.

In step 706, STA2 buffers the data frame into the corresponding automatic retransmission buffer and returns an incorrect-reception response frame to STA1.

The interframe space between the response frame and the data frame may be a short interframe space (SIFS) or another interframe space. For example, in this example embodiment, as shown in FIG. 8, the interframe space between the response frame and the data frame is a short interframe space.

When STA1 receives the correct-reception response frame, transmission of the data frame is successful, and transmission of the next data frame may be performed; otherwise, step 707 is performed.

In step 707, when receiving the incorrect-reception response frame, STA1 sends a retransmission frame of the data frame to STA2.

The retransmission frame of the data frame carries the same valid information as the data frame and carries the same redundant information as the data frame or different redundant information than the data frame. The valid information is information bits to be coded and transmitted. The data frame includes, but is not limited to, a first transmission frame.

In step 708, when receiving the retransmission frame of the data frame, STA2 determines whether the retransmission frame is received correctly.

When the data frame is determined to be received correctly, transmission of the data frame is successful, and step 709 is performed. When the data frame is determined to be received incorrectly, step 710 or 711 is performed.

In step 709, STA2 decodes the data frame and returns a correct-reception response frame to STA1.

In step 710, STA2 buffers the retransmission frame into the corresponding automatic retransmission buffer and returns an incorrect-reception response frame to STA1.

In step 711, STA2 performs combination processing of the retransmission frame of the data frame and the data frame buffered in the automatic retransmission buffer.

After step 711, step 712 may also be performed.

In step 712, STA2 determines whether a combination-processed data frame is received correctly. When the combination-processed data frame is received incorrectly, step 713 is performed. When the combination-processed data frame is received correctly, step 714 is performed.

In step 713, the combination-processed data frame is buffered into the automatic retransmission buffer.

Further, step 713 may further include returning an incorrect-reception response frame to STA1.

In step 714, the data frame is decoded, and the data frame or the retransmission frame of the data frame and the combination-processed data frame in the automatic retransmission buffer are cleared.

When receiving the incorrect-reception response frame, STA1 returns to step 707 and sends the retransmission frame of the data frame to STA2 again. Then, again STA2 determines whether the retransmission frame is received correctly. These operations are performed repeatedly until the data frame is transmitted successfully. In the flow of the preceding method, when the reception is determined to be incorrect and combination processing is required, if stored in the automatic retransmission buffer is a combined data frame that has been combination-processed previously, then the current operation is combination processing of the last received frame and the combined frame buffered in the buffer.

Figure 9:
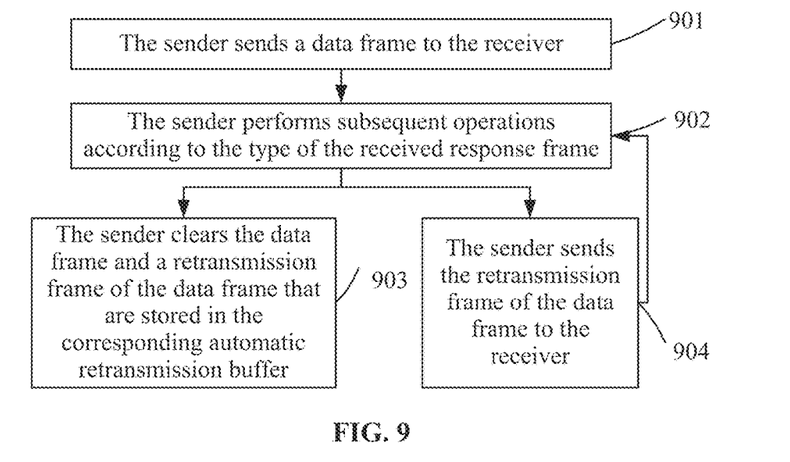
FIG. 9 is a flowchart of a method for implementing an automatic retransmission function by a sender according to example embodiments of the present disclosure.
Figure 10:
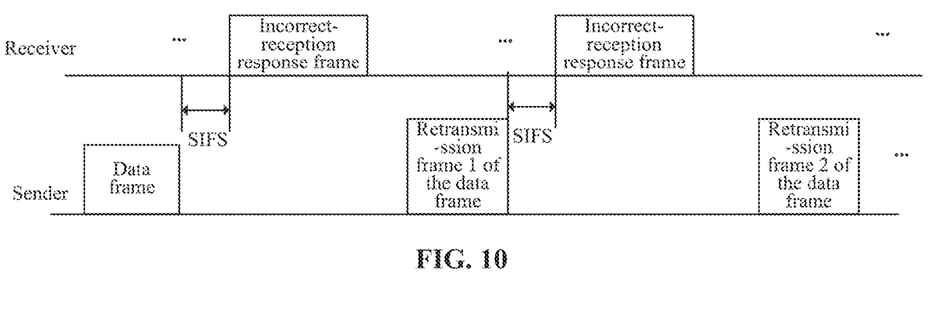
FIG. 10 is a diagram showing transmission of a method for implementing an automatic retransmission function by a sender according to example embodiments of the present disclosure.

FIG. 9 is a flowchart of a method for implementing an automatic retransmission function by a sender according to example embodiments of the present disclosure. FIG. 10 is a diagram showing transmission of a method for implementing an automatic retransmission function by a sender according to example embodiments of the present disclosure. This example embodiment differs from the example embodiments described with reference to FIGS. 5 to 8 in that when receiving a correct-reception response frame sent by a station (for example, STA2) that serves as a data frame receiver, a station (for example, STA1) that serves as a data frame sender clears a data frame and a retransmission frame of the data frame that are buffered in its own automatic retransmission buffer and that have been transmitted successfully.

For example, when sending a data frame or a retransmission frame of the data frame, the sender buffers the data frame or the retransmission frame of the data frame into the corresponding automatic retransmission buffer.

As shown in FIG. 9, in one example embodiment, the method may include steps 901 to 904.

In step 901, the sender sends a data frame to the receiver.

For example, before step 901, the sender has enabled the automatic retransmission function and configured an automatic retransmission buffer for the current transmission. For details about the enabling and configuration process, reference may be made to the preceding example embodiments. The details are not repeated here.

Here the sender or the receiver may be an access point (AP) or a non-access point (non-AP).

In step 902, the sender performs subsequent operations according to the type of the received response frame.

Here the type of the response frame includes a correct-reception response frame and an incorrect-reception response frame.

When receiving a correct-reception response frame, the sender performs step 903. When receiving an incorrect-reception response frame, the sender performs step 904.

In step 903, the sender clears the data frame and a retransmission frame of the data frame that are stored in the corresponding automatic retransmission buffer. When receiving the correct-reception response frame, the sender transmits the data frame successfully and may continue to transmit the next data frame.

In step 904, the sender sends the retransmission frame of the data frame to the receiver.

After step 904, the sender returns to step 902 so that again the sender performs subsequent operations according to the type of the received response frame. These operations are performed repeatedly until the data frame is transmitted successfully. See FIG. 10.

Figure 11:
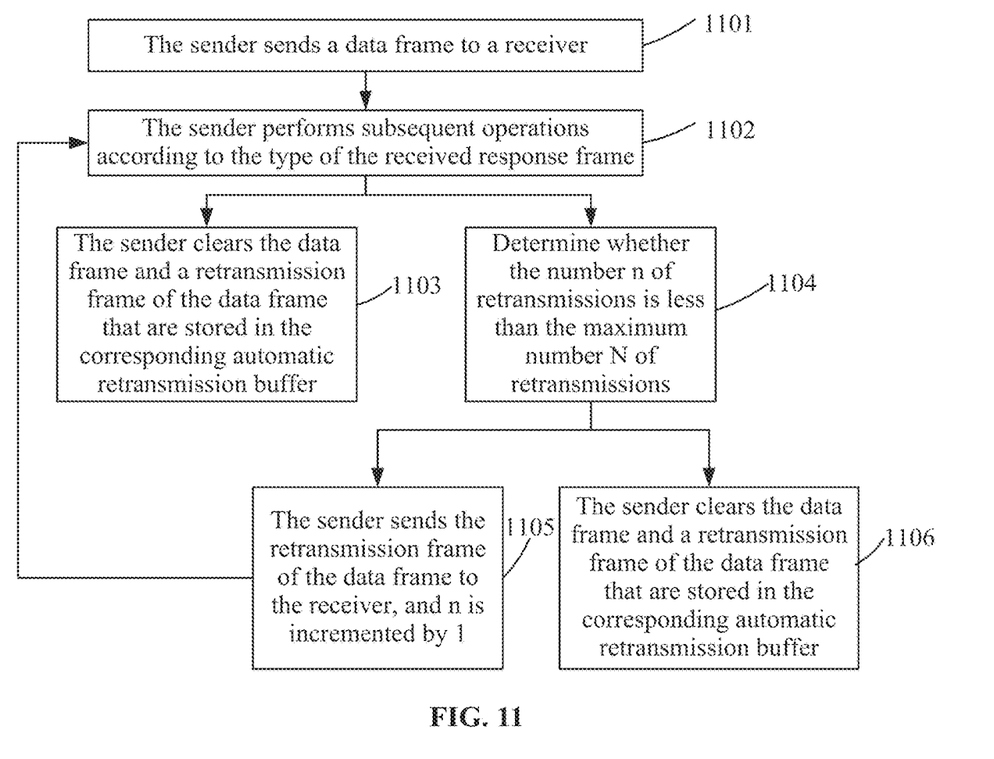
FIG. 11 is a flowchart of another method for implementing an automatic retransmission function by a sender according to example embodiments of the present disclosure.

FIG. 11 is a flowchart of another method for implementing an automatic retransmission function by a sender according to example embodiments of the present disclosure. This example embodiment differs from the example embodiments described with reference to FIGS. 5 to 8 in that the maximum number N of retransmissions is set for a station that serves as a data frame sender. The maximum number N of retransmissions is generated according to one of the following: set by the sender when the automatic retransmission function is enabled; notified by an access point (AP) to the sender; carried in a first message and sent to the sender; or preset by a wireless local area network system and then notified to the sender.

As shown in FIG. 11, in one example embodiment, the method may include steps 1101 to 1106.

In step 1101, the sender sends a data frame to a receiver.

For example, before step 1101, the sender has enabled the automatic retransmission function and configured an automatic retransmission buffer for the current transmission. For details about the enabling and configuration process, reference may be made to the preceding example embodiments. The details are not repeated here. Moreover, the sender already knows its own maximum number N of retransmissions.

For example, the maximum number N of retransmissions may be carried in the first message and notified to the sender and the receiver, may be notified by the AP to the sender before the sender sends the data frame, may be predefined by the wireless local area network system and then notified to the sender before the sender sends the data frame, or may be set by the sender when the automatic retransmission function is enabled.

Here the sender or the receiver may be an AP or a non-AP.

In step 1102, the sender performs subsequent operations according to the type of the received response frame.

Here the type of the response frame includes a correct-reception response frame and an incorrect-reception response frame.

When receiving a correct-reception response frame, the sender performs step 1103. When receiving an incorrect-reception response frame, the sender performs step 1104.

In step 1103, the sender clears the data frame and a retransmission frame of the data frame that are stored in the corresponding automatic retransmission buffer.

Here the retransmission frame of the data frame may be each redundancy version of the data frame. When sending the data frame, the sender may buffer the data frame and the retransmission frame of the data frame into the corresponding automatic retransmission buffer.

Here when receiving the correct-reception response frame, the sender transmits the data frame successfully and may continue to transmit the next data frame.

In step 1104, it is determined whether the number n of retransmissions is less than the maximum number N of retransmissions.

Here the initial value of n is 1. When n is less than N, step 1105 is performed. When n is greater than or equal to N, step 1106 is performed.

In step 1105, the sender sends the retransmission frame of the data frame to the receiver, and n is incremented by 1.

Here the version i of the retransmission frame of the data frame sent each time may be the same or different.

After step 1105, the sender returns to step 1102 so that again the sender performs subsequent operations according to the type of the received response frame. Each time a retransmission frame is sent, n is incremented by 1. These operations are performed repeatedly until n is greater than or equal to N.

In step 1106, the sender clears the data frame and a retransmission frame of the data frame that are stored in the corresponding automatic retransmission buffer.

Here when n is greater than or equal to N, the data frame is no longer retransmitted.

In one example embodiment, the station that sends the first message may further send information about automatic retransmission. The information about the automatic retransmission includes at least one of redundancy version information of a data frame or a retransmission frame of the data frame or indication information of new transmission or retransmission.

When the reception is determined to be incorrect, the receiver performs the combination processing of the data frame or the retransmission frame of the data frame and the data frame or the retransmission frame of the data frame buffered in the automatic retransmission buffer or the combination-processed data buffered in the automatic retransmission buffer in the following manner: The receiver performs the combination processing according to information about automatic retransmission carried in the data frame or the retransmission frame of the data frame. The information about the automatic retransmission includes at least one of redundancy version information of the data frame or the retransmission frame of the data frame or indication information of new transmission or retransmission.

In one example embodiment, when the automatic retransmission enable information instructs that the automatic retransmission function be enabled, the instruction includes enabling the automatic retransmission function immediately or delaying enabling the automatic retransmission function.

When the instruction is delaying enabling the automatic retransmission function, the first message further includes information about start time at which the automatic retransmission function is enabled.

Additionally, when the automatic retransmission enable information instructs that the automatic retransmission function be enabled, the sender further sends at least one of the following time information: duration in which the automatic retransmission function is enabled or information about calculation of the duration, or time at which the automatic retransmission function is disabled. The duration in which the automatic retransmission function is enabled or the information about the calculation of the duration is used for instructing that timekeeping start from start time at which the automatic retransmission function is enabled and the automatic retransmission function be disabled when the duration ends. The time information is contained in the first message or in a second message sent by the sender station of the first message.

In one example embodiment, after STA1 in a BSS enables the automatic retransmission function according to the received automatic retransmission enable information, when STA1 determines that a received radio frame is incorrect, STA1 does not return an incorrect-reception response frame, but buffers the radio frame into the corresponding automatic retransmission buffer. Similarly, the sender of the radio frame may consider that the transmission fails when no response frame is received within a certain time limit and may send a retransmission frame of the radio frame to STA1 again.

Additionally, after STA1 in a BSS disables or does not enable the automatic retransmission function according to the received automatic retransmission enable information, when STA1 determines that a received radio frame is incorrect, STA1 does not return an incorrect-reception response frame, but discards the radio frame.

In one example embodiment, after a station in a BSS enables the automatic retransmission function according to the received automatic retransmission enable information, when the station determines that a data frame or a retransmission frame of the data frame is received incorrectly, the station buffers the data frame or the retransmission frame of the data frame into the corresponding automatic retransmission buffer. The automatic retransmission buffer is identified by the serial number of the data frame or identified by a serial number having a mapping relationship with the serial number of the data frame.

The receiver station clears the automatic retransmission buffer when one of the conditions below is satisfied.

(1) A data frame or a retransmission frame of the data frame is correctly received.

(2) The total size of a data frame and a retransmission frame of the data frame buffered reaches the size of the automatic retransmission buffer.

In one example embodiment, after the station in the BSS disables the automatic retransmission function according to the received automatic retransmission enable information, the method further includes that the station receives a data frame or a retransmission frame of the data frame sent by another station and determines whether the data frame or the retransmission frame is received correctly; when the data frame or the retransmission frame is determined to be received correctly, the station returns a correct-reception response frame and decodes the data frame; when the data frame or the retransmission frame is determined to be received incorrectly, the station discards the data frame or the retransmission frame and does not return any response frame.

In one example embodiment, the automatic retransmission enable information may be distinguished using different identifiers.

For example, when the automatic retransmission enable information is A, the automatic retransmission enable information instructs that the automatic retransmission function be enabled; when the automatic retransmission enable information is B, the automatic retransmission enable information instructs that the automatic retransmission function be disabled.

Additionally, when the automatic retransmission enable instruction is A, the automatic retransmission enable instruction is further used for instructing that an automatic retransmission buffer be configured for the current transmission. When the automatic retransmission enable instruction is B, the automatic retransmission enable instruction may be further used for instructing that the automatic retransmission buffer be cancelled, that is, used for instructing that the automatic retransmission buffer that has been configured be cancelled.

In the solution provided in the preceding example embodiments, after the automatic retransmission enable information is received, both the station as the data sender and the station as the data receiver can clearly know whether the automatic retransmission function is enabled at present; the sender of the first message can also send the information about the automatic retransmission; and the receiver buffers the incorrectly received data frame instead of discarding the incorrectly received data frame and performs data combination processing according to the information about the automatic retransmission. In this manner, different automatic retransmission mechanism requirements of different stations can be satisfied, and useful information of a data packet that cannot be decoded correctly can be reasonably utilized.

Embodiments of the present disclosure further provide a first station. The first station includes a memory, a processor, and a computer program stored in the memory and executable on the processor. When the computer program is executed by the processor, any method for implementing an automatic retransmission function by the sender of the first message as described herein is performed.

Embodiments of the present disclosure further provide a second station. The second station includes a memory, a processor, and a computer program stored in the memory and executable on the processor. When the computer program is executed by the processor, any method for implementing an automatic retransmission function by the receiver of the first message as described herein is performed.

Embodiments of the present disclosure further provide a computer-readable storage medium. An information processing program is stored in the computer-readable storage medium. When the information processing program is executed by the processor, steps of any method for implementing an automatic retransmission function as described herein are performed.

It is to be understood by those of ordinary skill in the art that all or some of the steps and systems in the methods disclosed herein and all or some of the function modules/units in the apparatuses disclosed herein may be implemented as software, firmware, hardware or a suitable combination thereof. In the hardware implementation, the division of the preceding function modules/units may not correspond to the division of physical components. For example, one physical component may have multiple functions, or one function or step may be performed jointly by several physical components. Some or all of the components may be implemented as software executed by a processor such as a digital signal processor or a microprocessor, may be implemented as hardware, or may be implemented as an integrated circuit such as an application-specific integrated circuit. Such software may be distributed over computer-readable media. The computer-readable media may include computer storage media (or non-transitory media) and communication media (or transitory media). As is known to those of ordinary skill in the art, the term computer storage media includes volatile and non-volatile as well as removable and non-removable media implemented in any method or technology for storing information (such as computer-readable instructions, data structures, program modules or other data). The computer storage media includes, but is not limited to, RAM, ROM, EEPROM, flash memory or other memory technologies, CD-ROM, digital versatile disc (DVD) or other optical disc storage, magnetic cartridge, magnetic tape, magnetic disk storage or other magnetic storage devices, or any other medium used for storing the desired information and accessible by a computer. Moreover, it is known to those of ordinary skill in the art that communication media typically includes computer-readable instructions, data structures, program modules or other data in signals such as carriers or modulated data signals transported in other transport mechanisms and may include any information delivery medium.

The embodiments disclosed herein are intended to facilitate an understanding of the present disclosure and not to limit the present disclosure. Any person skilled in the art to which the present disclosure pertains may make any modifications and changes in the form and details of implementation without departing from the spirit and scope disclosed herein, but the scope of the present patent is still subject to the scope defined by the appended claims.

What is claimed is:

1. A method for implementing an automatic retransmission function, comprising:
sending, by a first station, a first message, wherein the first message carries automatic retransmission enable information and the automatic retransmission enable information is used for instructing that the automatic retransmission function be enabled or disabled;
in response to the automatic retransmission enable information instructing that the automatic retransmission function be enabled, sending, by the first station, at least one of the following time information: duration in which the automatic retransmission function is enabled or information about calculation of the duration, or time at which the automatic retransmission function is disabled;

wherein the duration in which the automatic retransmission function is enabled or the information about the calculation of the duration is used for instructing that timekeeping start from start time at which the automatic retransmission function is enabled and the automatic retransmission function be disabled when the duration ends; and wherein the time information is contained in the first message or in a second message sent by the first station.

2. The method of claim 1, wherein when the automatic retransmission enable information is used for instructing that the automatic retransmission function be enabled, the automatic retransmission enable information is further used for instructing that an automatic retransmission buffer be configured for current transmission.

3. The method of claim 1, wherein when the automatic retransmission enable information instructs that the automatic retransmission function be enabled, the instruction comprises enabling the automatic retransmission function immediately or delaying enabling the automatic retransmission function; and when the instruction is delaying enabling the automatic retransmission function, the first message further comprises information about start time at which the automatic retransmission function is enabled.

4. The method of claim 1, further comprising:

further sending, by the first station, information about automatic retransmission, wherein the information about the automatic retransmission comprises at least one of: redundancy version information of a data frame or a retransmission frame of the data frame or indication information of new transmission or retransmission.

5. A method for implementing an automatic retransmission function, comprising:

receiving, by a second station, a first message sent by a first station; and enabling or disabling, by the second station, the automatic retransmission function according to automatic retransmission enable information carried in the first message;

when the second station enables the automatic retransmission function according to the automatic retransmission enable information, the method further comprises:

receiving, by the second station, a data frame or a retransmission frame of the data frame sent by a third station and determining, by the second station, whether the data frame or the retransmission frame is received correctly; and in response to the data frame or the retransmission frame being determined to be received incorrectly, buffering, by the second station, the data frame or the retransmission frame into an automatic retransmission buffer or performing, by the second station, combination processing of the retransmission frame of the data frame and the data frame or the retransmission frame of the data frame buffered in the automatic retransmission buffer.

6. The method of claim 5, further comprising:

configuring, by the second station, an automatic retransmission buffer according to the automatic retransmission enable information.

7. The method of claim 5, wherein after the performing the combination processing of the retransmission frame of the data frame and the data frame or the retransmission frame of the data frame buffered in the automatic retransmission buffer in response to the data frame or the retransmission frame being determined to be received incorrectly, the method further comprises:

determining, by the second station, whether a combination-processed data frame is received correctly, and in response to the combination-processed data frame being received incorrectly, buffering, by the second station, the combination-processed data frame into the automatic retransmission buffer; and in response to the combination-processed data frame being received correctly, decoding, by the second station, the data frame and clearing, by the second station, the data frame, the retransmission frame of the data frame and the combination-processed data frame in the automatic retransmission buffer.

8. The method of claim 5, further comprising: in response to the data frame or the retransmission frame being determined to be received incorrectly, performing, by the second station, combination processing of a combination-processed data buffered in the automatic retransmission buffer and the data frame or the retransmission frame of the data frame.

9. The method of claim 8, wherein in response to the data frame or the retransmission frame being determined to be received incorrectly, the performing the combination processing of the combination-processed data buffered in the automatic retransmission buffer and the data frame or the retransmission frame of the data frame comprises:

performing the combination processing according to information about automatic retransmission carried in the data frame or the retransmission frame of the data frame, wherein the information about the automatic retransmission comprises at least one of redundancy version information of the data frame or the retransmission frame of the data frame or indication information of new transmission or retransmission.

10. The method of claim 5, further comprising:

in response to the data frame or the retransmission frame being determined to be received incorrectly, returning, by the second station, an incorrect-reception response frame to the third station.

11. The method of claim 6, wherein the second station clears the automatic retransmission buffer when one of the following conditions is satisfied:

a data frame or a retransmission frame of the data frame is received correctly; or a total size of a data frame and a retransmission frame of the data frame buffered reaches a size of the automatic retransmission buffer.

12. The method of claim 5, wherein the third station and the first station are a same station or the third station and the first station are different stations.

13. A first station, comprising:

a sending unit, which is configured to send a first message, wherein the first message carries automatic retransmission enable information and the automatic retransmission enable information is used for instructing that the automatic retransmission function be enabled or disabled;

when the automatic retransmission enable information instructs that the automatic retransmission function be enabled, the sending unit is further configured to send at least one of the following time information: duration in which the automatic retransmission function is enabled or information about calculation of the duration, or time at which the automatic retransmission function is disabled;

wherein the duration in which the automatic retransmission function is enabled or the information about the calculation of the duration is used for instructing that timekeeping start from start time at which the automatic retransmission function is enabled and the automatic retransmission function be disabled when the duration ends; and wherein, the time information is contained in the first message or in a second message sent by the first station.

14. A first station, comprising a memory, a processor, and a computer program stored in the memory and executable on the processor, wherein when the computer program is executed by the processor, the method for implementing an automatic retransmission function according to claim 1 is performed.

15. A second station, comprising a memory, a processor, and a computer program stored in the memory and executable on the processor, wherein when the computer program is executed by the processor, the method for implementing an automatic retransmission function according to claim 5 is performed.

16. A non-transitory storage medium, wherein an information processing program is stored in the computer-readable storage medium, and when the information processing program is executed by the processor, the method for implementing an automatic retransmission function according to claim 1 is performed.

* * * * *